Jan. 20, 1959 I. POKOLIC 2,869,421
STILL PICTURE ATTACHMENT FOR MOVING PICTURE PROJECTORS
Filed July 30, 1957 2 Sheets-Sheet 1
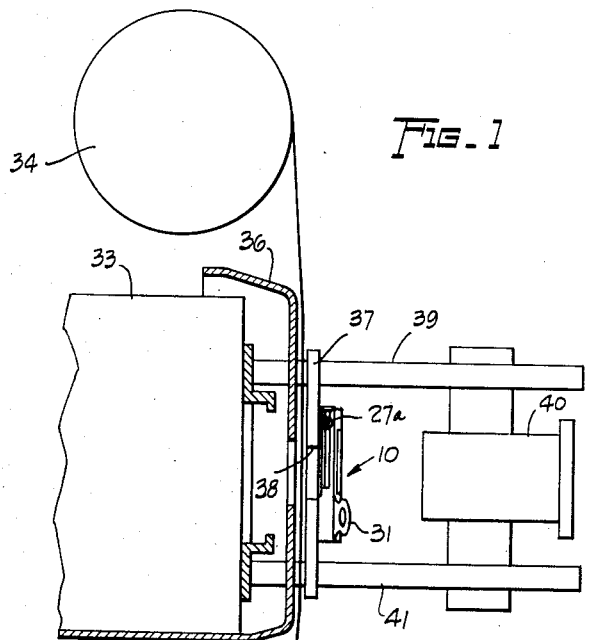
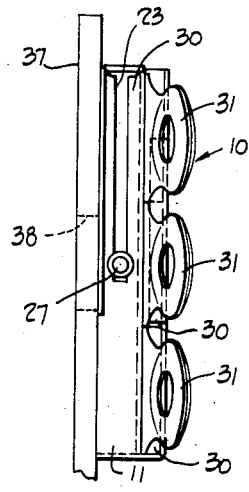
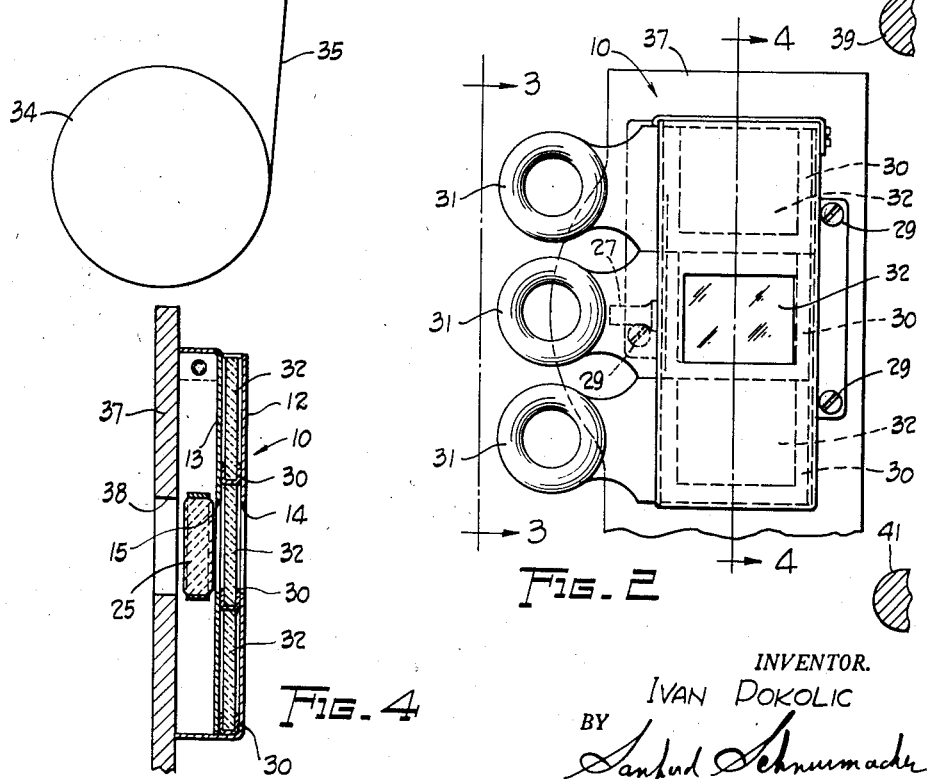
INVENTOR.
IVAN POKOLIC
BY Sanford Schnurmacher
ATTORNEY.

Jan. 20, 1959     I. POKOLIC     2,869,421
STILL PICTURE ATTACHMENT FOR MOVING PICTURE PROJECTORS
Filed July 30, 1957     2 Sheets-Sheet 2

INVENTOR.
IVAN POKOLIC
BY
Sanford Schnurmacher
ATTORNEY

United States Patent Office 2,869,421
Patented Jan. 20, 1959

---

2,869,421

STILL PICTURE ATTACHMENT FOR MOVING PICTURE PROJECTORS

Ivan Pokolic, Karlovac, Yugoslavia

Application July 30, 1957, Serial No. 675,170

1 Claim. (Cl. 88—28)

This invention relates to an attachment for motion picture projectors whereby still pictures or subjects in other than strip form can be projected onto a distant screen with the use of the same powerful light source employed in projecting the motion picture film.

The primary object of the invention is to provide a stereopticon attachment for regulation motion picture projectors, which utilizes the powerful light source of the projector, which is permanently attached to the film gate of the projector and which provides instantaneous conversion between moving picture and stereopticon projection.

Another object is to provide a device of the type stated that requires no change in the moving picture projector lens assembly.

Still another object is to provide a device including means for shielding the still picture which is to be projected, from the heat of the illuminating lamp.

A further object of this invention is the provision of an organization in which the constituent elements are so arranged structurally and functionally as to assure improved results with materials which may be manufactured at reasonable cost, which may be easily assembled and which will be efficient in operation with minimum wear to the part.

These, and other objects of the invention will become apparent from a reading of the following specification and claim, together with the accompanying drawing, wherein;

Figure 1 is a side view, partly in section, of the projection portion of a conventional moving picture projecting machine, showing the still picture attachment, which is the subject of the invention, mounted on the film gate thereof;

Figure 2 is a front elevation of the attachment, mounted on the film gate, and arranged for projection of still pictures;

Figure 3 is a left end view of the device illustrated in Figure 2;

Figure 4 is a vertical sectional view taken along the line and in the direction of the arrows 4—4 of Figure 2;

Figure 5:
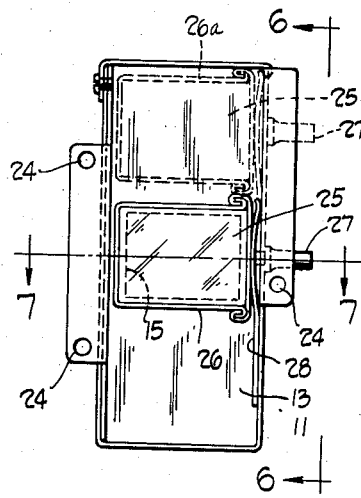
Figure 5 is a front view of the unmounted device without the transparency holding frames nested therein.

Referring more particularly to the drawings, there is seen in Figure 1 the attachment that is the subject of the invention, broadly indicated by reference numeral 10, mounted on the film gate 37 of a conventional moving picture projector 33. The projector 33 has the usual light source and film moving mechanism, not illustrated. The moving picture film 35 is fed between the reels 34 in the usual intermittent manner. The film strip 35 is threaded over the film guide 36 past the film gate 37 in the usual manner. The gate 37 has an opening 38 through which the light for the projector lamp can pass to carry the film image to the projection lens system 40 which is mounted on focusing rods 39 and 41 in the usual manner. All the foregoing mechanical structure of the moving picture projector is standard and the operation of the machine 33 as a projector of moving pictures is not effected by the presence of the attachment 10.

Figure 6:
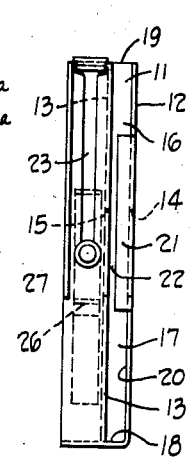
Figure 6 is a right end view taken along the line and in the direction of the arrows 6—6 of Figure 5.
Figure 7:
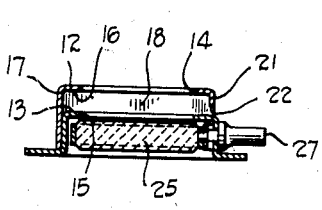
Figure 7 is a vertical sectional view taken along the line and in the direction of the arrows 7—7 of Figure 5.
Figure 8:
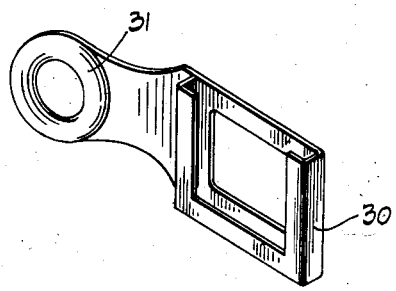
Figure 8 is a perspective view of one of the transparency holding frames.
Figure 9:
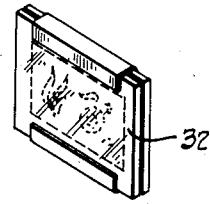
Figure 9 is a perspective view of one of the transparencies adapted to be held in the frame illustrated in Figure 8.

The attachment 10 comprises a substantially rectangular sheet metal case 11 having spaced front and rear walls 12 and 13, respectively, defining a vertically extending channel 16, therebetween, closed at the bottom 18 and along one side 17, as seen most clearly in Figures 6 and 7. The channel 16 is open at the top 19 and along its other side 20. The spaced walls 12 and 13 having aligned openings 14 and 15, respectively, therethrough, as seen in Figure 6.

The front wall 12 has a rearwardly extending flange 21 extending upwardly from the lower edge of the aforesaid wall openings 14 and 15, and spaced from the rear wall 13 to define a slot 22. The channel side 20 below the flange 21 being completely open.

The case 11 is mounted on the front of the gate 37 by means of screws 29 which pass through suitably spaced holes 24 in the case 11. The case 11 is so mounted that the wall openings 14 and 15 are aligned with the gate opening 38 on the optical center of the lens system 40.

Reference numeral 25 indicates a piece of heat absorbing glass which is mounted in a frame 26 which is in turn slidably mounted in the case 11 behind the rear wall 13. The glass 25 is slidable vertically of a slot 23, by means of a handle 27, between a first position wherein the glass 25 is aligned with the several openings 38, 14 and 15, and a second position, indicated by reference numeral 27a in Figure 5, wherein the glass 25 is above and clear of the several openings. The frame 26 is frictionally maintained in adjusted positions by means of a flat spring 28.

Reference numeral 30 indicates a slotted frame adapted to receive a transparency 32 therein. The frame 30 has a laterally extending handle 31. The transparency 32 comprises a film having a single picture or an advertising message thereon, and is mounted between two pieces of glass, as is well known to those skilled in the art.

The transparency 32 is of a size and shape to be fitted snugly in the carrier frame 30. The carrier frames 30 are inserted into the case 11 through the open top end 19 of the channel 20, with the handle 31 extending through the slot 22. The frames may be stacked one upon the other in the channel 20, as seen in Figures 2, 3 and 4. The lowest transparency frame 30 will be below the openings 14 and 15, the next highest frame will be aligned with the openings 14 and 15, and the top frame 30 will be above the openings 14 and 15. A study of the drawings will indicate that the lowest frame 30, resting on the bottom wall 18, is entirely below the flange 21 with its handle 31 clear of the slot 22. The upper transparency frames 30 are held by the flange 21 with their handles 31 extended through the slot 22. It will be evident that the lowest frame 30 may be withdrawn sideways out of the channel 20, while the upper frames are held against side movement by the flange 21. However, if the lower frame 30 is withdrawn, the frames stacked on it are free to fall vertically of the channel to take its place, since their handles 31 may move vertically of the slot 22.

As described hereinabove the case 11 is attached to the face of the film gate 37 with the openings 14 and 15 aligned with the film gate opening 38. The heat absorbing glass 25 is moved to the position 25a, clear of the several openings. In this condition the film gate may be opened and the moving picture film threaded through it in the usual manner. The gate is closed, and the projector can then be operated to project a moving picture just as though the attachment 10 were not present. When it is desired to use the projector to project a still picture, the moving picture film is removed or run off in the usual manner. The heat absorbing glass 25 is moved downward into alignment with the several openings 38, 14 and 15 as seen in Figures 2, 3, 4, 5 and 6. Three transparency frames 30, are stacked in the channel 11, as seen in Figures 3, 4 and 5. The center transparency will then be aligned with the openings 38 of the film gate 37 and the openings 14 and 15 of the case 11.

Light coming from the projection lamp will pass through the heat absorbing glass 25 before reaching the transparency 32, thereby protecting it from excessive and damaging heat. The still picture image then passes through the optical projection system 40, which will only require slight re-focusing of the lenses to compensate for the slight forward displacement of the picture image, due to the fact that the still picture film 32 is approximately ½ inch forward of the position of the moving picture film 35. To change the still picture image it is only necessary to pull out the lower frame, and re-stack it on the top frame. The structure illustrated provides for three different pictures, but any number of different still pictures may be projected by continually stacking new frames, on top of the ones remaining, as the lower frames are continually removed.

To re-convert back to moving picture projection, all but the bottom frame 30 is removed from the channel 20 and the heat resistant glass 25 is moved upward, clear of the openings, as seen in Figure 1.

It thus will be evident that an inexpensive, simple, and reliable attachment for quickly converting a motion picture projector to stereopticon usage has been provided.

The attachment 10 remains mounted on the gate 37, and does not interfere with the ordinary operation of the projector. No complicated tubes, optical gadgets, or demountable structures are required for conversion from one use to the other as is the case with prior art devices.

It will now be clear that there is provided a device which accomplishes the objectives heretofore set forth. While the invention has been disclosed in its preferred form; it is to be understood that the specific embodiment thereof as described and illustrated herein is not to be considered in a limited sense as there may be other forms or modifications of the invention which should also be construed to come within the scope of the appended claim.

I claim:

In combination with a motion picture projector of the type having a film gate and a focusing lens member mounted outwardly of said gate, an attachment for quickly converting same to stereopticon usage, comprising, a housing adapted to be mounted directly on the film gate over the projection opening thereof, the housing having bounding side walls and spaced front and rear walls defining a recessed rear compartment and a vertically extending channel between the front and rear walls, said channel being closed at the bottom and along one side and open at the top and along the other side, the front and rear walls having aligned openings therethrough positioned at the optical axis of the film gate, the side walls having laterally extending mounting ears adapted to seat against the film gate, said ears having mounting holes therein to receive mounting screws passed through the film gate, a heat absorbing window slidably mounted in the rear compartment and movable between a first position, in register with the rear wall opening, and a second position, clear of said wall opening, the front wall having a rearwardly extending flange along the open side of the channel, the said flange being spaced from the rear wall to define a slot starting at the lower edge of the front and rear wall openings and extending upwardly thereof, leaving the channel side below the flange completely open, and a plurality of transparency holding frames having laterally extending handles, slidably mounted in said channel in vertically stacked arrangement, with their handles extending through the slot, the frame resting on the bottom of the channel being movable sideways through said open channel side below the flange, the frames resting on the bottom frame being movable vertically of said channel and slot, only, the spacing of the stacked frames being such that one of the framed transparencies will be aligned with the optical axis of the projector and the housing wall openings when two or more frames are stacked in the channel.

References Cited in the file of this patent

UNITED STATES PATENTS

| | | |
|---|---|---|
| 1,636,647 | Patterson | July 19, 1927 |
| 2,438,333 | Dickman | Mar. 23, 1948 |
| 2,452,745 | Getter | Nov. 2, 1948 |
| 2,583,510 | Ingram | Jan. 22, 1952 |
| 2,611,293 | Weiss | Sept. 23, 1952 |
| 2,651,968 | Frey | Sept. 15, 1953 |
| 2,712,268 | Dietmann | July 5, 1955 |

FOREIGN PATENTS

| | | |
|---|---|---|
| 847,048 | France | June 19, 1939 |